Figure 1:
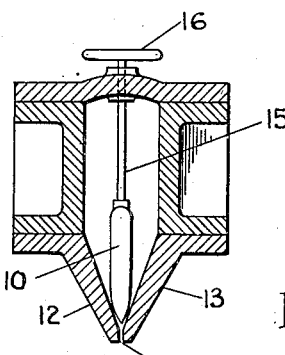

Sept. 8, 1936.  A. SCHADE ET AL  2,053,920

EXTRUSION DEVICE AND PROCESS

Filed Dec. 13, 1934

APPLICANTS
Arthur Schade
Eugen Schweitzer. Deceased.
BY Anni Schweitzer. Administratrix.

Charles F. Daley
ATTORNEY.

Patented Sept. 8, 1936

2,053,920

UNITED STATES PATENT OFFICE 2,053,920

EXTRUSION DEVICE AND PROCESS

Arthur Schade, Wiesbaden-Biebrich, and Eugen Schweitzer, deceased, late of Wiesbaden-Biebrich, Germany, by Anni Schweitzer, administratrix, Wiesbaden-Biebrich, Germany, assignors, by mesne assignments, to E. I. du Pont de Nemours & Company, Wilmington, Del., a corporation of Delaware Application December 13, 1934, Serial No. 757,394
In Germany December 12, 1933

13 Claims. (Cl. 18—15)

This invention relates to an apparatus and method of extrusion, and it pertains particularly to improvements in extrusion devices which are adapted for the production of thin, non-fibrous sheets and films, such as regenerated cellulose, customarily used for wrapping tissues and the like, cellulose esters and ethers, gelatin and casein.

In the manufacture of films, for example, of regenerated cellulose, it is customary to extrude a coagulable liquid such as viscose into a coagulating bath from a hopper which is provided with hopper lips separated slightly from each other so as to form an elongated orifice. The thickness of the film may be regulated by varying the width of the orifice or the slit, or by changing the pressure at which the viscose is extruded. It has previously been necessary to adjust the hopper lips, that is to say, the lips forming the extrusion orifice, very accurately while maintaining them parallel to each other, in order to avoid fluctuations in thickness within the width of the film band. Since the width of the orifice amounts only to a fraction of a millimeter, for the production of thin film such as is used for wrapping tissues, this adjustment from a technical standpoint is very difficult. Moreover, accurately adjusted, parallel hopper lips do not guarantee a uniformity in the thickness of the film, since the subsequent shrinkage influences the thickness of the band on the edges and in the center in a various degree. This variation in thickness requires compensation in order to attain uniformity of thickness. Furthermore, due to the high viscosity of the liquid viscose, there is ordinarily a considerable pressure drop from the point at which the viscose is admitted to the interior of the hopper to the most distant point of the hopper lips. In order to overcome this, the hopper lips at points closest to the viscose admission point must be positioned more closely together than those of the hopper lips situated farthest therefrom.

In order to eliminate variations in the thickness of the film, the hopper lips have, up to the present time, been pressed together or spread out at various points by means of suitable adjusting devices uniformly distributed over the entire length of the lips. For reasons of construction, the hopper lips must be very substantial and must be built solidly. It is therefore only possible to distort the lips slightly by applied pressure, and the effect is furthermore spread out over a relatively large section of the length of the orifice. Consequently, localized inequality can only be eliminated by this process to an imperfect degree. In addition, it frequently happens that by virtue of the tension produced in the lips, the regulation produced at one point by pressure causes unintentional changes at other points. Finally, it is impossible to use hoppers of a fragile nature such as glass, which might successfully resist corrosion, since glass cannot stand the strain of such pressure as would be necessary to sufficiently distort the glass to effect the proper amount of regulation.

It is an object of the present invention to provide a means and method for the production of film and the like having a satisfactory uniform thickness. Another object of the invention comprises an efficient regulation of the thickness of the film independently at various points lengthwise of the extrusion mouthpiece. A further object of the invention relates to means for regulating the thickness of the film and thereby to insure the production of film of uniform thickness without changing the size of the extrusion orifice after it has been properly adjusted. Other objects of the invention will appear hereinafter.

Figure 1A:
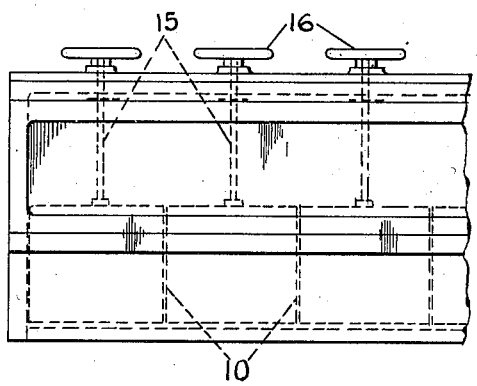

Referring to the figures, in which like numerals represent like parts, Fig. 1 represents one form of device shown in sections, which is capable of use in accordance with the principles of the invention; Fig. 1a represents a front elevation of the device shown in Fig. 1; Figs. 2–5 represent modified forms of the regulating device shown in Fig. 1; and Figs. 2a–5a represent side elevations of Figs. 2–5.

The objects of the invention are attained, in general, by the use of devices arranged within the hopper and adjacent the hopper lips, said devices being so placed that they can be independently adjusted within the hopper by regulating devices disposed outside of the hopper, so as to regulate the flow of the casting solution through the hopper lips at various points. These regulating devices will ordinarily be arranged over the entire length of the hopper orifice and will of course be capable of independent operation.

The novel regulating devices and the process to which they are adapted have the advantage that the hopper lips may first be set to a certain gage and need not thereafter have their positions relative to each other changed, yet, regulation of the flow of the liquid can be accomplished to a highly satisfactory degree. It is thus possible to obviate the difficulties encountered where it has been previously necessary to adjust the massive and solidly constructed hopper lips, and it is even possible, within the scope of this invention, to use materials more fragile than metal, e. g. glass. The adjustable devices for controlling the flow of the cellulosic solution may be made of relatively light material which is quite obviously less expensive, more easily adjustable and more easily regulated than heavy material. In addition, the regulating devices are, to a great extent, protected against the corrosive influences exerted by the coagulating liquid and consequently have a long life. In accordance with the new means and method of adjustment comprising this invention, even though the movement of the regulating members may not be finely adjustable, it is easy to obtain an accurate regulation in the thickness of the solution extruded from the hopper, because the regulating devices will be spaced a certain distance from the hopper opening, and there are also provided spaces having a certain buffering effect upon the regulating devices.

Referring to the figures of the drawing, Fig. 1 represents one form of construction for regulating the flow of the casting solution in which a plurality of prismatic or wedge-shaped bodies 10, which touch each other laterally as shown in Fig. 1a but which have slidable contact with each other, are arranged within the hopper 11 just above the wedge-shaped hopper lips 12 and 13, spaced from each other uniformly to form an elongated orifice 14 at their lower edges. The wedge-shaped members 10 are adjusted towards or away from orifice 14 through rods 15 having a screw connection with regulating wheels 16 mounted for rotation at the top of the hopper. The wedge-shaped flow regulating members 10 may thus be independently moved upwardly or downwardly within the hopper at any point along the length of the hopper lips depending upon the amount of adjustment desired in order to obtain the proper uniformity of thickness in the film. By virtue of the wedge-shaped lower end of wedge-shaped members 10, the path of the cellulosic solution is downwardly at an angle between the hopper and said regulating members 10, and thence to the orifice. The flow-regulating members 10, except for the lower ends thereof, may be streamlined in order to eliminate eddies or dead spaces. In the practical manufacture of films of about 1 meter width, about twelve to fifteen regulating wedges have been found suitable.

Figure 2:
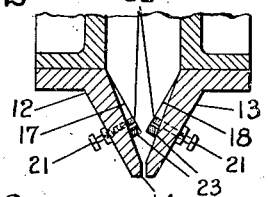
Figure 2A:
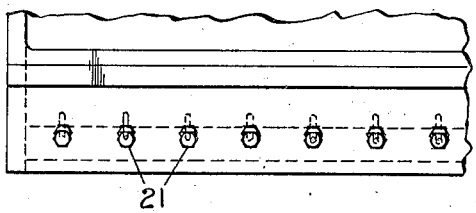

Referring to Figs. 2 and 2a, these figures illustrate a modified form of regulating device comprising elastic sheet metal members 17 and 18, each being arranged the entire length of the hopper and fastened in place on the hopper lips at their upper ends 19 and 20 by any suitable means, e. g., welding. At various spaced points, and preferably equidistant from each other, along the length of the hopper opening, there are provided adjusting screws 21 having a screw-threaded connection through the hopper lips, the inner ends 22 of the adjusting screws bearing against the lower inner sides of the sheet metal members 17 and 18. The lower ends of the sheet metal members may be adjusted closer together or farther apart at every point along their respective lengths by means of the adjusting screws which of course may be operated independently, thereby forming an adjustable slit in front of the principal extrusion slit 14. The dead spaces formed at the lower free ends of the sheet metal members may be sealed off, for example, by means of rubber gaskets 23 disposed lengthwise of and between the sheet metal members and the inner sides of the hopper lips.

Figure 3:
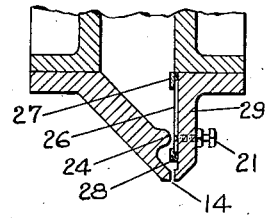
Figure 3A:
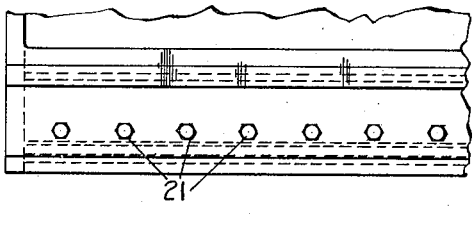

Figs. 3 and 3a illustrate a construction in which all dead spaces are avoided. The regulating slit is formed in front of extrusion orifice 14 by means of the solid protuberance 24 integral with hopper lips 25 and disposed the entire length of the hopper lips and cooperating with an elastic membrane 26 affixed at its upper end 27 and at its lower end 28 to hopper lip 29. The membrane 26, being flexible, may be adjusted towards or away from the protuberance 24 by means of a number of adjusting screws 21 disposed lengthwise of and having screw-threaded connections through the hopper lip 29, the inner ends of the adjusting screws bearing against the inner side of the flexible membrane opposite protuberance 24. The flow of the casting solution is regulated by the movement of the flexible portion of the member 26 lying between its fixed ends.

Figure 4:
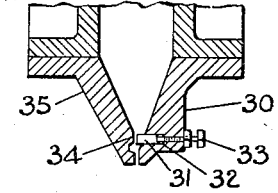
Figure 4A:
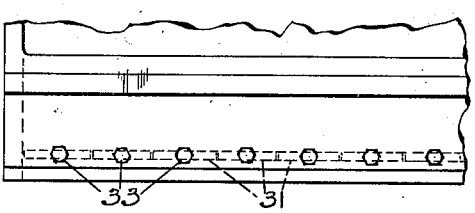

Referring to Figs. 4 and 4a, it will be noted that there are provided in the hopper lip 30 a series of slidable rectangular members 31 sliding in receptacle or receptacles 32 actuated by adjusting screws 33, members 31 being arranged longitudinally of the hopper lip and in slidable contact with each other. By adjusting the rectangular members 31 closer to or farther away from longitudinal protuberance 34 formed integral with hopper lips 35, the flow of the casting solution through the extrusion orifice may be increased or decreased.

Figure 5:
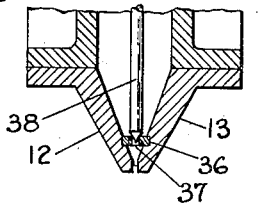
Figure 5A:
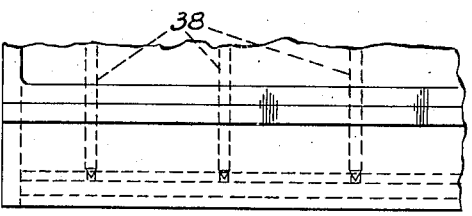

Fig. 5 shows a still further modification in which a strip 36 is set between hopper lips 12 and 13 as shown and is provided with a series of orifices 37. Coacting with these orifices are a series of needle valves 38, one for each orifice, the valves being regulated upwardly and downwardly with respect to the said orifices by any suitable means, for example, such as is shown in Fig. 1, thereby suitably regulating the flow of the liquid.

The invention is particularly adaptable to the casting of regenerated cellulose films from viscose by extruding a thin stream of viscose from the hopper lips into a coagulating and regenerating bath followed by the usual subsequent film-treating operations. It is also applicable, in its broader scope, to the production of film from cuprammonium cellulose solutions, from solutions of cellulosic esters and ethers, e. g., cellulose acetate, ethyl cellulose, glycol cellulose, etc., which can be used in wet casting operations, as well as to other extrusion and film-forming processes involving similar problems of regulation.

The scope of the invention is not intended to be limited to the specific forms of regulating devices described in detail above. Any modification or variation which conforms to the spirit of the invention is intended to be included within the scope of the claims.

What is claimed is:—

1. In a method adapted for the production of film by the extrusion of a coagulable solution through an elongated orifice, the steps which comprise compensating for variations in the film by regulating the flow of the liquid through the orifice at various points lengthwise of said orifice, said regulation comprising obstructing the flow of the liquid from the orifice prior to its extrusion from said orifice, and independently increasing or decreasing the degree of obstruction to the flow of the liquid at various points over the length of the orifice.

2. The method of claim 1 characterized in that said solution is a cellulosic solution.

3. The method of claim 1 characterized in that said solution is viscose.

4. Apparatus for the casting of film which comprises a hopper, hopper lips attached thereto forming an elongated extrusion mouthpiece, means positioned within said hopper and adjacent said mouthpiece for obstructing the flow of liquid through said mouthpiece, said last named means comprising a plurality of independently operated elements, and means for operating said elements independently whereby to regulate the degree of obstruction to said liquid at various points along the length of said mouthpiece.

5. In an apparatus for extruding a film of a coagulable solution into a setting bath, oppositely disposed hopper lips providing therebetween a slit-like opening, independently operable means for varying the thickness of said film at a plurality of sections along the length of said opening without changing the width of said opening.

6. In an apparatus for extruding a film of a coagulable solution into a setting bath, oppositely disposed hopper lips providing therebetween a slit-like opening, independently operable means movably positioned between said hopper lips for varying the thickness of said film at a plurality of sections along the length of said opening without changing the width of said opening.

7. The apparatus defined in claim 6 in which the movably positioned means consists of a plurality of bodies individually movable toward and away from said opening.

8. The apparatus defined in claim 6 in which the movably positioned means consists of a plurality of wedge-shaped bodies individually movable toward and away from said opening to vary the amount of solution passing through said opening.

9. In an apparatus for extruding a film of a coagulable solution into a setting bath, oppositely disposed hopper lips providing therebetween a slit-like opening, cooperating means having a second slit-like opening between said hopper lips and independently operable means for varying the width of said second slit-like opening at a plurality of sections along the length thereof without changing the width of said first-named opening.

10. In an apparatus for extruding a film of a coagulable solution into a setting bath, oppositely disposed hopper lips providing therebetween a slit-like opening, a member positioned between said hopper lips along the entire length thereof, a plurality of openings in said member for feeding said coagulable solution to said hopper lips, and a plurality of individually operable means for opening and closing said openings.

11. In a method for extruding a film of a coagulable solution from a hopper through an elongated orifice into a setting bath, the step which comprises adjusting the thickness of the film at various sections thereof by independently regulating the flow of the solution to the orifice at various sections within the hopper and lengthwise of said orifice.

12. The method of claim 11 characterized in that said solution is a cellulosic solution.

13. The method of claim 11 characterized in that said solution is viscose.

ARTHUR SCHADE.
ANNI SCHWEITZER,
*Administratrix of Eugen Schweitzer, Deceased.*